United States Patent Office 3,502,676
Patented Mar. 24, 1970

3,502,676
PRODUCTION OF AROMATIC THIOAMIDES
Friedrich Becke, Heidelberg, and Helmuth Hagen, Ludwigshafen (Rhine), Germany, assignors to Badische Anilin- & Soda-Fabrik Aktiengesellschaft, Ludwigshafen (Rhine), Germany
No Drawing. Filed Mar. 26, 1968, Ser. No. 715,949
Claims priority, application Germany, Mar. 30, 1967, 1,272,287
Int. Cl. C07c *153/05*
U.S. Cl. 260—267   9 Claims

ABSTRACT OF THE DISCLOSURE

An improved process for the production of aromatic thioamides by reaction of aromatic compounds having up to eighteen carbon atoms and containing halogenated methyl groups with sulfur and ammonia, primary amines or secondary amines at temperatures of from 25° to 200° C., the improvement consisting in the use as starting materials of aromatic compounds having up to eighteen carbon atoms and containing once or more than once in the molecule the group having the formula —$CH_2X$ in which X denotes a chlorine atom, bromine atom or iodine atom. Aromatic thioamides are used as accelerators in vulcanization.

---

The object of this invention is to provide an improved process for the production of aromatic thioamides in which more readily accessible starting materials are used than hitherto. It is also an object of the invention to provide a process in which a smaller amount of acid-binding agent is required than hitherto.

In accordance with this invention these and other objects and advantages are obtained in an improved process for the production of aromatic thioamides by reaction of aromatic compounds having up to eighteen carbon atoms and containing halogenated methyl groups with sulfur and ammonia or primary or secondary amines at temperatures of 25° to 200° C. wherein the improvement comprises using as starting materials aromatic compounds having up to eighteen carbon atoms and containing the group having the formula —$CH_2X$ (in which X denotes chlorine, bromine or iodine) once or more than once in the molecule.

The new process has the advantage that more readily accessible starting materials may be used. Moreover a smaller amount of acid-binding agent is required for the reaction.

The reaction of benzyl chloride with sulfur, ammonia and sodium methylate may be illustrated by the following equation:

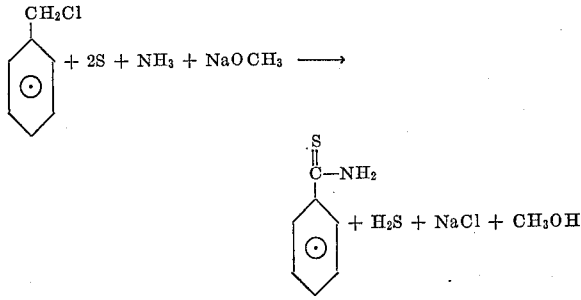

In the present specification, the term "aromatic compounds" includes mononuclear or polynuclear, condensed or uncondensed cyclic compounds having up to eighteen carbon atoms, particularly those having five or six members in the individual rings, and having aromatic character. They may therefore be purely carbocyclic or may have hetero atoms, for example oxygen, sulfur or nitrogen atoms, in the ring. They contain once or more than once in the molecule the group —$CH_2X$ in which X denotes chlorine, bromine or iodine, particularly chlorine or bromine. In addition to the group —$CH_2X$ they may contain substituents which are inert under the reaction conditions, for example alkyl groups or alkoxy groups, particularly those having one to four carbon atoms, carboxyl groups or halogen atoms. Aromatic compounds containing one to three —$CH_2X$ groups (in which X denotes chlorine or bromine) and having up to fourteen carbon atoms, particularly up to twelve carbon atoms, are preferred. The most important compounds of this type are derived from benzene or naphthalene and contain the group —$CH_2X$ (in which X denotes chlorine or bromine) once or twice. Examples of suitable starting materials are: benzyl chloride, benzyl bromide, benzyl iodide, 2,6-dichlorobenzyl chloride, 4-methoxybenzyl chloride, 1-chloromethylnaphthalene, 2-chloromethylanthracene, 1-bromomethylphenanthrene, 4-chloromethyldiphenyl, 4,4'-bis-(chloromethyl)-diphenyl, 4-chloromethylpyridine, 2-chloromethylquinoline, 2-bromomethylthiophenes and 2-chloromethylphenazine.

Elementary sulfur, preferably in finely divided form, is used for the reaction.

The reaction is carried out with ammonia or primary or secondary amines. Primary or secondary amines having aliphatic, cycloaliphatic, araliphatic or aromatic hydrocarbon radicals with up to twelve carbon atoms, particularly up to eight carbon atoms. Examples of suitable amines are: methylamine, dimethylamine, ethylamine, butylamine, butylmethylamine, dodecylamine, cyclohexylamine, benzylamine, aniline or methylaniline.

Reaction is advantageously carried out in the presence of agents which bind hydrogen halides and which liberate the corresponding bases from ammonium halides. It is preferred to use, as agents which bind hydrogen halides, oxides or hydroxides of metals of main Groups 1 and 2 of the Periodic System or alcoholates or phenolates of metals of main Group 1 of the Periodic System. Examples of suitable oxides and hydroxides are sodium hydroxide, potassium hydroxide, sodium oxide, potassium oxide, calcium oxide, calcium hydroxide, barium oxide and barium hydroxide. It is preferred to use the hydroxides of sodium and potassium, particularly calcium oxide. Examples of alcoholates or phenolates which are suitable are those of alkanols, cycloalkanols, arylalkanols or phenols, preferably those having up to twenty, particularly up to eight, carbon atoms. Specific examples of suitable alcoholates and phenolates are: sodium methylate, sodium ethylate, potassium butylate, sodium laurate, potassium oleate and sodium phenolate. Alcoholates of alkanols having one to four carbon atoms in the alkyl radical, particularly sodium methylate, are used especially frequently because of their ready accessibility.

Obviously an excess of ammonia or primary or secondary amine may be used instead of the said acid-binding agents.

When the said acid-binding agents are used, it is preferred to use, for 1 equivalent of the group —$CH_2X$, about 2 gram atoms of sulfur and about 1 mole of ammonia or primary or secondary amine and also sufficient acid-binding agent to combine with 1 mole of hydrogen halide. It is preferable to use ammonia or the said amines and also the agent for combining with hydrogen halide in an excess, for example of up to 10 equivalent percent. When the reaction is carried out in the absence of the said hydrogen halide binding agents, it is advantageous to use 2 gram atoms of sulfur and 3 moles of ammonia or primary or secondary amine for each equivalent of the group —CH$_2$X.

The reaction is advantageously carried out at a temperature of from 25° to 200° C. Particularly good results are obtained when using a temperature of from 50° to 150° C. The reaction is usually carried out at atmospheric pressure; when compounds are used which boil below the temperature used, the reaction is advantageously carried out at a pressure at which the starting material is present in the liquid phase.

The reaction is advantageously carried out in the presence of a solvent which is inert under the reaction conditions. Examples of suitable solvents are: hydrocarbons such as cyclohexane, benzene and toluene, and ethers such as tetrahydrofuran and dioxane. It is also possible to use an excess of ammonia or of the said amines as a solvent.

The process according to this invention may be carried out for example by placing the starting materials, in the presence or absence of a solvent and an agent for binding hydrogen halide, in the proportions specified above in a stirred vessel and heating the whole to the specified temperature. The reaction is in general over after three to twenty hours. The reaction mixture is then filtered off from insoluble constituents and the solvent and any excess amine are distilled off from the reaction solution. The residue is advantageously recrystallized from a solvent which is suitable for recrystallizing thiobenzamides.

The aromatic thioamides prepared by the process according to the invention are suitable as accelerators in vulcanization.

The invention is further illustrated by the following examples. The parts given in the following examples are parts by weight unless otherwise stated; they bear the same relation to parts by volume as the kilogram to the liter.

EXAMPLE 1

500 parts by volume of toluene, 64 parts of sulfur and 200 parts of cyclohexylamine are placed in a stirred vessel having a capacity of 2000 parts by volume, 126 parts of benzyl chloride is introduced into the reaction mixture at 110° C. within thirty minutes. The reaction mixture is then heated under reflux for sixteen hours. After the reaction mixture has cooled, the deposited cyclohexylamine hydrochloride is filtered off. The solvent is then removed from the filtrate by distillation and the residue obtained is recrystallized from ligroin. 170.5 parts of N-cyclohexylthiobenzamide is obtained having a melting point of 88° to 90° C. The yield is 79.5% of the theory.

EXAMPLE 2

500 parts by volume of toluene, 64 parts of sulfur and 214 parts of benzylamine are placed in a stirred vessel. 126 parts of benzyl chloride is allowed to flow in at 110° C. within thirty minutes. The reaction mixture is then heated for sixteen hours under reflux. After it has cooled, the deposited benzylamine hydrochloride is filtered off and the solvent is removed from the filtrate by distillation. The residue is recrystallized from ligroin. 187 parts of N-benzylthiobenzamide is obtained having a melting point of 82° to 83° C. The yield is 84.8% of the theory.

EXAMPLE 3

The procedure of Example 1 is followed but using 170 parts of piperidine instead of cyclohexylamine. After the reaction mixture has cooled, the deposited piperidine hydrochloride is filtered off, the solvent is removed by distillation and the residue is distilled at subatmospheric pressure. The solidified distillate is recrystallized from ligroin. 120 parts of N-pentamethylenethiobenzamide is obtained having a melting point of 60° to 61° C.

EXAMPLE 4

63 parts of benzyl chloride, 32 parts of sulfur, 150 parts by volume of benzene and 90 parts by volume of ammonia are heated in an autoclave for eight hours at 120° C. while stirring. After the reaction mixture has cooled, it is filtered and the solvent is separated from the filtrate by distillation. The residue is recrystallized from benzene. 52 parts of thiobenzamide having a melting point of 114° to 115° C. is obtained. The yield is 76% of the theory.

EXAMPLE 5

500 parts by volume of toluene, 64 parts of sulfur and 300 parts of cyclohexylamine are placed in a stirred vessel and 170 parts of p-carboxybenzyl chloride is allowed to flow in at room temperature within five minutes. The reaction mixture heats up to 70° C. The whole is then heated to 110° C. and another 250 parts by volume of toluene is added. The reaction mixture is heated for sixteen hours under reflux and allowed to cool. The precipitate formed is then filtered off and taken up in water. The insoluble part is filtered off and recrystallized from dioxane. 290 parts of the cyclohexylammonium salt of p-carboxy-N-cyclohexylthiobenzamide is obtained. The yield is 80% of the theory. p-Carboxy-N-cyclohexylthiobenzamide is recovered by the following method: 50 parts of the cyclohexylammonium salt of p-carboxy-N-cyclohexylthiobenzamide is boiled under reflux with 500 parts by volume of 15% by weight acetic acid for two hours and then allowed to cool. The precipitate is filtered off. 26 parts of p-carboxy-N-cyclohexylthiobenzamide is obtained.

EXAMPLE 6

500 parts by volume of toluene, 64 parts of sulfur, 100 parts of cyclohexylamine and 60 parts of sodium methylate are placed in a stirred vessel and 126 parts of benzyl chloride is allowed to flow in at 110° C. within thirty minutes. The reaction mixture is heated under reflux for sixteen hours. After the product has cooled, the precipitate is filtered off and the solvent is removed from the filtrate by distillation. The residue obtained is recrystallized from ligroin. 169 parts of N-cyclohexylthiobenzamide having a melting point of 84° to 86° C. is obtained.

We claim:

1. A process for the production of aromatic thioamides by reaction of aromatic compounds having up to eighteen carbon atoms and containing halomethyl groups with sulfur and ammonia or primary or secondary amines at temperatures of 25° to 200° C., wherein the improvement comprises using as starting material an aromatic compound having up to eighteen carbon atoms and containing 1–3 groups having the formula —CH$_2$X (in which X denotes chlorine, bromine or iodine) in the molecule.

2. A process as claimed in claim 1 in which an aromatic compound derived from benzene or naphthalene and containing the group —CH$_2$X (in which X denotes chlorine or bromine) once or twice in the molecule is used as starting material.

3. A process as claimed in claim 2 in which an aromatic compond is used as starting material which contains up to fourteen carbon atoms and which contains the group —CH$_2$X (in which X denotes chlorine or bromine) once or twice in the molecule.

4. A process as claimed in claim 3 in which a primary or secondary amine having an aliphatic, cycloaliphatic, araliphatic or aromatic hydrocarbon radical having up to twelve carbon atoms is used.

5. A process as claimed in claim 4 in which an agent which binds hydrogen halide and which liberates the corresponding bases from ammonium halides is additionally used.

6. A process as claimed in claim 5 in which an oxide or hydroxide of a metal of main Groups 1 or 2 of the Periodic System or an alcoholate or phenolate of a metal of main Group 1 of the Periodic System is used as the agent for binding hydrogen halide.

7. A process as claimed in claim 6 in which for each equivalent of the group —CH$_2$X about 2 gram atoms of sulfur, about 1 mole of ammonia, primary amine or secondary amine and sufficient acid-binding agent to bind 1 mole of hydrogen halide are use.

8. A process as claimed in claim 7 in which the reaction is carried out at 50° to 150° C.

9. A process as claimed in claim 8 in which a solvent which is inert under the reaction conditions is used.

References Cited

UNITED STATES PATENTS 2,845,449   7/1958   Toland.

HENRY R. JILES, Primary Examiner

260—551, 293.4, 516, 288, 329, 294.8, 784, 791, 792, 798, 795, 79.5